United States Patent
Ai et al.

(10) Patent No.: US 11,709,102 B1
(45) Date of Patent: Jul. 25, 2023

(54) FOOD TEMPERATURE DETECTION SYSTEM

(71) Applicant: Shenzhen Hongkang International Electronic Technology Co., Ltd., Shenzhen (CN)

(72) Inventors: Qilong Ai, Shenzhen (CN); Jieyuan Tan, Shenzhen (CN)

(73) Assignee: Shenzhen Hongkang International Electronic Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/862,429

(22) Filed: Jul. 12, 2022

(30) Foreign Application Priority Data

Jun. 1, 2022 (CN) .......................... 202221383462.2

(51) Int. Cl.
*G01K 1/02* (2021.01)
*G01K 1/024* (2021.01)

(52) U.S. Cl.
CPC ............. *G01K 1/026* (2013.01); *G01K 1/024* (2013.01); *G01K 2207/02* (2013.01); *G01K 2207/06* (2013.01)

(58) Field of Classification Search
CPC .... G01K 1/026; G01K 1/024; G01K 2207/02; G01K 2207/06
See application file for complete search history.

(56) References Cited

FOREIGN PATENT DOCUMENTS

| CN | 209085781 U | | 7/2019 |
|---|---|---|---|
| CN | 212030751 U | * | 11/2020 |
| CN | 213874723 U | | 8/2021 |
| CN | 215246921 U | | 12/2021 |

OTHER PUBLICATIONS

English machine translation of Huang et al. (CN 212030751 U) (Year: 2020).*

* cited by examiner

*Primary Examiner* — Roy Y Yi
*Assistant Examiner* — Geoffrey T Evans
(74) *Attorney, Agent, or Firm* — Nitin Kaushik (57) ABSTRACT

The utility model relates to the field of temperature detection, in particular to a food temperature detection system. The food temperature detection system comprises a temperature collector, a distance amplifier and a processing device. The temperature collector and the distance amplifier both are connected with the processing device, and the temperature collector is connected with the distance amplifier. The temperature collector collects the temperature of food, then the collected food temperature information is sent to the distance amplifier, and the distance amplifier performs signal enhancement on the collected food temperature information, so that a transmission distance of the food temperature information is increased. By additionally arranging the distance amplifier, the food temperature information is enhanced, so that the processing device is capable of acquiring the food temperature information stably, thereby improving the detection accuracy of food temperature.

9 Claims, 13 Drawing Sheets

FOOD TEMPERATURE DETECTION SYSTEM

TECHNICAL FIELD

The utility model relates to the field of temperature detection, in particular to a food temperature detection system.

BACKGROUND

In a cooking process, it is sometimes needed to control the temperature of cooked food accurately. In most cases, a cook will insert a temperature measuring needle into the food being cooked to monitor the food. However, grease will be generated along with the heating process of the food, and the grease will splash along with rise of food temperature to scald the skin of the cook.

In order to prevent the grease from splashing to scald the skin, in the prior art, an independent display device is arranged to prevent the grease from splashing to scald the skin. However, as the data transmission distance between the display device and the temperature measuring needle is limited, the display device sometimes cannot display the monitored food temperature correctly.

SUMMARY

In view of this, the utility model is intended to resolve the technical problem that in the prior art, the display device cannot display the monitored food temperature correctly as the data transmission distance between the display device and the temperature measuring needle is limited, and provides a food temperature detection system.

According to a first aspect, the utility model provides a food temperature detection system, including a temperature collector configured to collect food temperature information, a distance amplifier configured to improve a transmission range of the food temperature information collected by the temperature collector and a processing device configured to receive the food temperature information, where the temperature collector and the distance amplifier both are connected with the processing device, and the temperature collector is connected with the distance amplifier.

Optionally, the food temperature detection system includes at least one temperature collector.

Optionally, the temperature collector is a needle thermometer.

Optionally, the distance amplifier includes:

a transmitting and receiving circuit, connected with the temperature collector and configured to receive the food temperature information collected by the temperature collector so as to output the food temperature information with the amplified transmission range;

a first controller, connected with the transmitting and receiving circuit and configured to receive the food temperature information collected by the temperature collector so as to amplify an output range of the food temperature information;

a switching circuit, connected with the first controller and configured to turn on or off the first controller; and a first power supply circuit, connected with the first controller and configured to supply power to the distance amplifier.

Optionally, the transmitting and receiving circuit includes: a signal transmitting and receiving chip, a first crystal oscillator, an MOS tube, a first inductor, a second inductor, a third inductor, a fourth inductor, a fifth inductor, a first capacitor, a second capacitor, a third capacitor, a fourth capacitor, a fifth capacitor, a sixth capacitor, a seventh capacitor, an eighth capacitor, a ninth capacitor, a tenth capacitor, an eleventh capacitor and an antenna, where a first end of the signal transmitting and receiving chip is connected with first ends of the first inductor, the second inductor and the ninth inductor, a second end of the ninth capacitor is connected with first ends of the third inductor and the fourth inductor, a second end of the fourth inductor is connected with first ends of the eleventh capacitor and the fifth inductor, and a second end of the fifth inductor is connected with the antenna; second ends of the eleventh capacitor and the second inductor both are grounded; a second end of the signal transmitting and receiving chip is connected with second ends of the first inductor and the third inductor and a first end of the tenth capacitor, and a second end of the tenth capacitor is grounded;

a fourth end of the signal transmitting and receiving chip is connected with a first end of the eighth capacitor; a fifth end of the signal transmitting and receiving chip, a sixth end of the signal transmitting and receiving chip and a second end of the eighth capacitor all are grounded; a seventh end of the signal transmitting and receiving chip is connected with first ends of the seventh capacitor and the MOS tube, a second end of the MOS tube is connected with a power supply, and a control end of the MOS tube is connected with the first controller; a second end of the seventh capacitor is grounded; a ninth end of the signal transmitting and receiving chip is connected with the first end of the first capacitor, a tenth end of the signal transmitting and receiving chip is connected with a first end of the second capacitor, an eleventh end of the signal transmitting and receiving chip is connected with a first end of the third capacitor, a twelfth end of the signal transmitting and receiving chip is connected with a first end of the fourth capacitor, and second ends of the first capacitor, the second capacitor, the third capacitor and the fourth capacitor all are grounded;

a thirteenth end of the signal transmitting and receiving chip is connected with first ends of the crystal oscillator and the fifth capacitor, a fourteenth end of the signal transmitting and receiving chip is connected with second ends of the first crystal oscillator and the sixth capacitor, and second ends of the fifth capacitor and the sixth capacitor both are grounded; and a fifteenth end of the signal transmitting and receiving chip is connected with the power supply.

Optionally, the processing device includes:

a receiving circuit, configured to receive the food temperature information with the amplified transmission range;

a second controller, connected with the receiving circuit and configured to receive the food temperature information so as to output to-be-displayed food temperature information; and a display circuit, connected with the controller and configured to display the food temperature information.

Optionally, the display circuit includes:

a display screen and a driving sub circuit, wherein the display screen is connected with the driving sub circuit, and the driving sub circuit is configured to receive the to-be-displayed food temperature information so as to control the display screen to display the food temperature information.

Optionally, the driving sub circuit includes a driving chip, a second crystal oscillator, a sixth inductor, a seventh inductor, a twelfth capacitor, a thirteenth capacitor and a fourteenth capacitor, where a first end of the driving chip is connected with the display screen and first ends of the second crystal oscillator and the twelfth capacitor, a second end of the driving chip is connected with second ends of the second crystal oscillator and the twelfth capacitor, and second ends of the driving chip, the second crystal oscillator and the twelfth capacitor all are grounded; a third end of the driving chip and the sixth end of the driving chip are connected with the power supply; a fifth end of the driving chip is connected with first ends of the sixth inductor and the thirteenth capacitor, a second end of the thirteenth capacitor is connected with a first end of the seventh inductor, a second end of the seventh inductor is connected with a first end of the fourteenth capacitor and the controller, a second end of the fourteenth capacitor is grounded, and a second end of the sixth inductor is connected with a sixth end of the driving chip.

Optionally, the processing device includes: a selection circuit, connected with the controller and configured to select the displayed food temperature information.

Optionally, the processing device includes: a buzzer, connected with the controller and configured to send an alarm prompt when the food temperature information is greater than a preset value.

The technical solution of the utility model has the following advantages:

The temperature collector collects a temperature of food, then the collected food temperature information is sent to the distance amplifier, and the distance amplifier performs signal enhancement on the collected food temperature information, so that a transmission distance of the food temperature information is increased, and then the food temperature information is received and displayed by the processing device. By additionally arranging the distance amplifier, the food temperature information is enhanced, so that the processing device is capable of acquiring the food temperature information stably, thereby improving the detection accuracy of food temperature.

BRIEF DESCRIPTION OF DRAWINGS

In order to describe the specific embodiments of the utility model or the technical solutions in the prior art clearly, brief introduction is made below in accordance with drawings needed to be used in the specific embodiments or the description in the prior art. It is apparent that the drawings in the description below are some embodiments of the utility model. Those of ordinary skill in the art further can obtain other drawings in accordance with the drawings without creative efforts.

NUMERALS OF DRAWINGS

10—temperature collector; 20—distance amplifier; 30—processing device; 40—barbecued meat; 201—transmitting and receiving circuit; 202—first controller; 203—switching circuit; 204—first power supply circuit; 301—receiving circuit; 302—second controller; 303—display circuit; 304—selection circuit; 305—buzzer; 306-second power supply circuit; U1—signal transmitting and receiving chip; U2—driving chip; U3—transmitter; Y1—first crystal oscillator; Y2—second crystal oscillator; Y3—third crystal oscillator; M1—MOS tube; L1—first inductor; L2—second inductor; L3—third inductor; L4—fourth inductor; L5—fifth inductor; L6—sixth inductor; L7—seventh inductor; L8—eighth inductor; L9—ninth inductor; C1—first capacitor; C2—second capacitor; C3—third capacitor; C4—fourth capacitor; C5—fifth capacitor; C6—sixth capacitor; C7—seventh capacitor; C8—eighth capacitor; C9—ninth capacitor; C10—tenth capacitor; C11—eleventh capacitor; C12—twelfth capacitor; C13—thirteenth capacitor; C14—fourteenth capacitor; C15—fiftheenth capacitor; C16—sixteenth capacitor; C17—seventeeth capacitor; C18—eighteenth capacitor; C19—ninteenth capacitor; C20—twentieth capacitor; C21—twenty-first capacitor; C22—twenty-second capacitor; C23—twenty-third capacitor; ANT-antenna; Q1—first triode; R1—first resistor; R2—second resistor; JP1—buzzer body.

DETAILED DESCRIPTION OF THE EMBODIMENTS

Clear and intact description will be made on technical solution of the utility model below in combination with drawings. Apparently, the described embodiments are merely a part of embodiments of the utility model and are not all the embodiments. On a basis of the embodiments in the utility model, all other embodiments obtained by those skilled in the technical field without creative efforts fall into the scope of protection of the utility model.

In the descriptions of the utility model, it is to be noted that the orientations or positional relationships indicated by the technical terms "center", "upper", "lower", "left", "right", "vertical", "horizontal", "inside", "outside", and the like are based on the orientations or positional relationships shown in the accompanying drawings. They are merely intended for ease of description of the embodiments of this application and simplification of the description, rather than to indicate or imply that the apparatuses or components mentioned in this application must have the specified orientations or must be constructed and operated in the specified orientations, and therefore shall not be construed as limitations on the embodiments of this application. In addition, the terms "first", "second" and "third" are merely used for a description purpose, and shall not be understood as indication or implication of relative importance.

In the descriptions of the utility model, it is to be noted that unless otherwise specified and defined explicitly, the terms "mount", "connect" and "join" should be understood in their general senses. For example, they may refer to a fixed connection, a detachable connection, or an integral union; or refer to a mechanical connection or an electrical connection; or refer to a direct connection or an indirect connection through an intermediate medium; or refer to internal communication between two components; or refer to a wireless connection, or a wired connection. Those of ordinary skill in the art can understand specific meanings of these terms in the embodiments as appropriate to specific situations.

In addition, technical features involved in the different embodiments of the utility model described below can be combined with one another as long as they do not conflict with each other.

Figure 1:
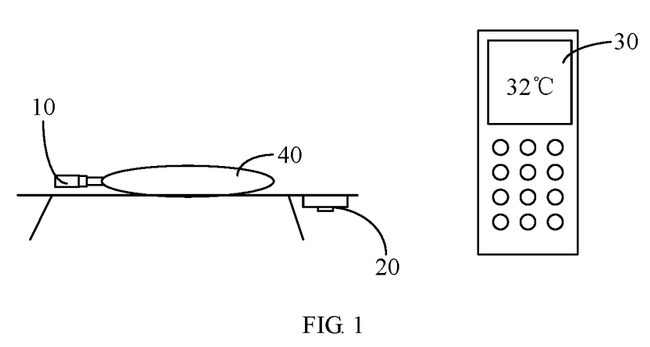
FIG. 1 is a scene schematic diagram of a food temperature detection system provided by the utility model.

The food temperature detection system provided by the embodiments can be applied to detecting a temperature of barbecued meat. FIG. 1 is a scene schematic diagram of a food temperature detection system provided by the embodiment. By taking barbecued meat 40 as an example, the food temperature detection system provided by the embodiment includes a processing device 30, a temperature collector inserted into the barbecued meat 40 and a distance amplifier 20 arranged at the bottom of a heating tray, where the temperature collector 10 can be a temperature measuring needle which is inserted into to-be-detected food and measure temperature information of food when being heated. The distance amplifier 20 can be a relay configured to amplify the transmitted signal, thereby improving the transmission stability and correctness. The processing device 30 can be a device combining the controller and the display. In the embodiment, the processing device 30 receives the temperature information and displays it.

Figure 2:
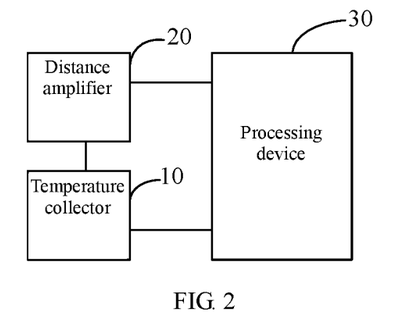
FIG. 2 is a structure block diagram of a food temperature detection system provided by the utility model.
Figure 3:
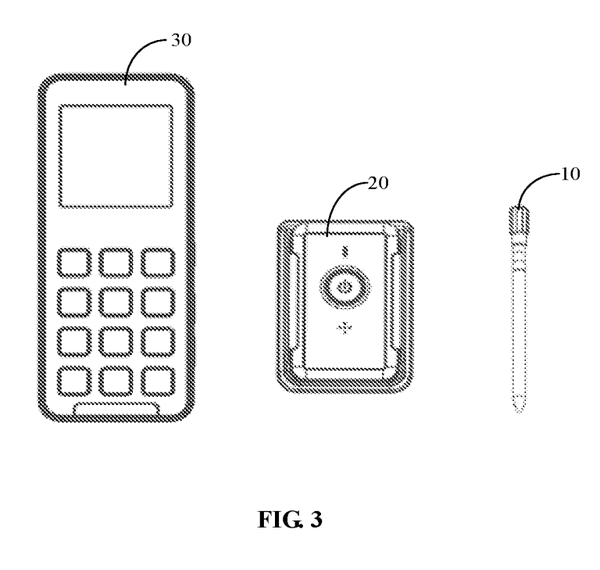
FIG. 3 is a schematic structure diagram of a food temperature detection system provided by the utility model.

A food temperature detection system provided by the embodiment, as shown in FIG. 2 to FIG. 3, includes a temperature collector 10 configured to collect food temperature information, a distance amplifier 20 configured to improve a transmission range of the food temperature information collected by the temperature collector and a processing device 30 configured to receive the food temperature information, where the temperature collector 10 and the distance amplifier 20 are in communication connection with the processing device 30.

According to the food temperature detection system provided by the utility model, the temperature collector 10 collects a temperature of food, then the collected food temperature information is sent to the distance amplifier 20, and the distance amplifier 20 performs signal enhancement on the collected food temperature information, so that a transmission distance of the food temperature information is increased, and then the processing device 30 receives the food temperature information with the enhanced signal and displays it. By additionally arranging the distance amplifier 30, the transmission distance of the food temperature information is enhanced, so that the processing device 30 is capable of acquiring the food temperature information stably, thereby improving the detection accuracy of food temperature.

Figure 4:
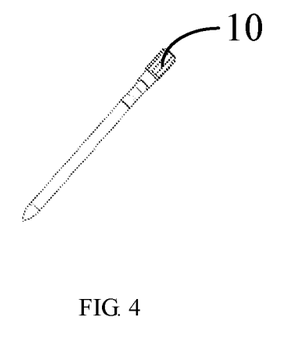
FIG. 4 is a stereo schematic diagram of a temperature collector in an optional food temperature detection system provided by the utility model.

Optionally, as shown in FIG. 4, the temperature collector 10 can be a needle thermometer. It is needed to insert the needle thermometer into the to-be-detected food when the needle thermometer is used to detect the food. There can be a plurality of temperature collectors 10, the temperature collectors 10 are provided with signal emission units configured to send the collected temperature information, and the emission units can be radio frequency circuits constructed by radio frequency chips, for example, radio transceivers CMT2300A, an energy storage element configured to supply power to a transmitting unit and a temperature sensor configured to collect food temperature.

Figure 5:
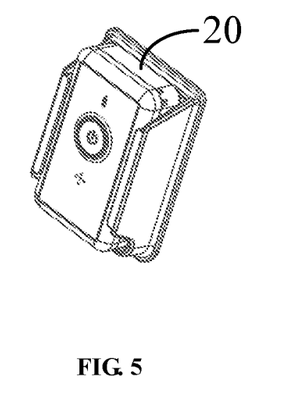
FIG. 5 is a stereo schematic diagram of a distance amplifier in an optional food temperature detection system provided by the utility model.

Optionally, as shown in FIG. 5, the distance amplifier 20 can be a relay which receives the temperature information sent by the temperature collector 10 and enhances the temperature information so as to improve the subsequent transmission distance of the temperature information, thereby guaranteeing that the temperature information received by the processing device 30 is correct. In the embodiment, the relay can be arranged on a lateral side of a heating tray for bearing the to-be-detected food, and it is needed to place the relay away from a heat source, or the relay can further be arranged according to user needs to meet a condition that the relay can receive the temperature information collected by the temperature collector 20.

Figure 6:
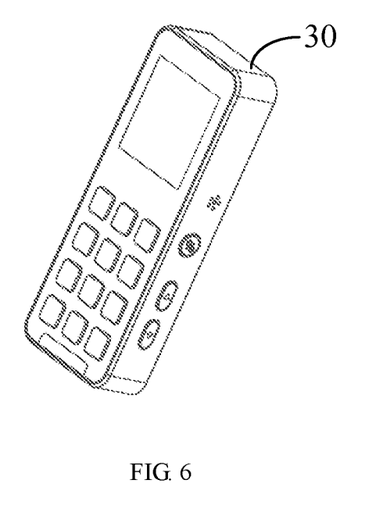
FIG. 6 is a stereo schematic diagram of a processing device in an optional food temperature detection system provided by the utility model.

Optionally, as shown in FIG. 6, the processing device 30 can be internally provided with a function selection key; a power supply element that supplies power to the processing device, for example, a battery; a display configured to display a temperature detection result; and a communication element configured to transmit and receive signals.

Figure 7:
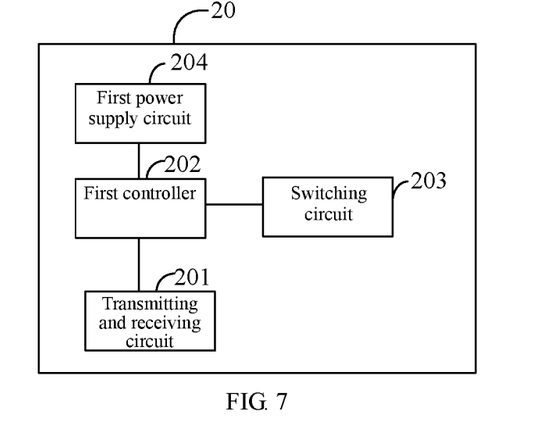
FIG. 7 is a schematic structure diagram of a distance amplifier in a food temperature detection system provided by the utility model.

As shown in FIG. 7 to FIG. 10, the food temperature detection system provided by the embodiment is specifically as shown in FIG. 7. The distance amplifier 20 thereof can include: a transmitting and receiving circuit 201, a first controller 202, a switching circuit 203 and a first power supply circuit 204, where the first power supply circuit 204 is configured to supply power to the distance amplifier 20, so that the distance amplifier 20 thereof can work normally. The transmitting and receiving circuit 201 is connected with the temperature collector 10, the temperature collector 10 is in communication connection with the transmitting and receiving circuit 201, and the transmitting and receiving circuit 201 is electrically connected with the first controller 202. In the embodiment of this application, the transmitting and receiving circuit 201 is configured to receive the food temperature information collected by the temperature collector 20 and then to transmit the food temperature information to the first controller 202. The first controller 202 performs signal enhancement/amplification on the food temperature information, and then the food temperature information processed by the first controller 202 is outputted by the transmitting and receiving circuit.

Figure 8:
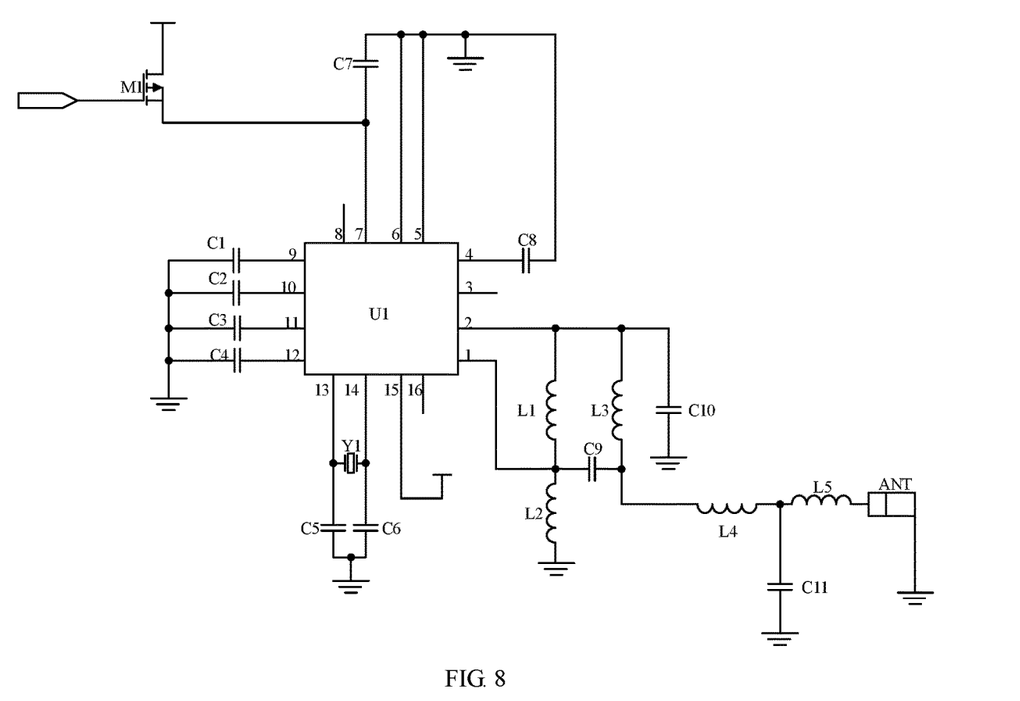
FIG. 8 is a circuit schematic diagram of a transmitting and receiving circuit of a distance amplifier in a food temperature detection system provided by the utility model.

Optionally, as shown in FIG. 8, the transmitting and receiving circuit specifically includes: a signal transmitting and receiving chip U1, a first crystal oscillator Y1, an MOS tube M1, a first inductor L1, a second inductor L2, a third inductor L3, a fourth inductor L4, a fifth inductor L5, a first capacitor C1, a second capacitor C2, a third capacitor C3, a fourth capacitor C4, a fifth capacitor C5, a sixth capacitor C6, a seventh capacitor C7, an eighth capacitor C8, a ninth capacitor C9, a tenth capacitor C10, an eleventh capacitor C11 and an antenna ANT, where a first end of the signal transmitting and receiving chip U1 is connected with first ends of the first inductor, the second inductor L2 and the ninth inductor C9, a second end of the ninth capacitor C9 is connected with first ends of the third inductor L3 and the fourth inductor L4, a second end of the fourth inductor L4 is connected with first ends of the eleventh capacitor C11 and the fifth inductor L5, and a second end of the fifth inductor L5 is connected with the antenna; second ends of the eleventh capacitor C11 and the second inductor L2 both are grounded; a second end of the signal transmitting and receiving chip U1 is connected with second ends of the first inductor L1 and the third inductor L3 and a first end of the tenth capacitor C10, and a second end of the tenth capacitor C10 is grounded;

a fourth end of the signal transmitting and receiving chip U1 is connected with a first end of the eighth capacitor C8; a fifth end of the signal transmitting and receiving chip U1, a sixth end of the signal transmitting and receiving chip U1 and a second end of the eighth capacitor C8 all are grounded; a seventh end of the signal transmitting and receiving chip U1 is connected with first ends of the seventh capacitor C7 and the MOS tube M1, a second end of the MOS tube M1 is connected with a power supply, and a control end of the MOS tube M1 is connected with the first controller 203; a second end of the seventh capacitor C7 is grounded; a ninth end of the signal transmitting and receiving chip U1 is connected with the first end of the first capacitor C1, a tenth end of the signal transmitting and receiving chip U1 is connected with a first end of the second capacitor C2, an eleventh end of the signal transmitting and receiving chip U1 is connected with a first end of the third capacitor C3, a twelfth end of the signal transmitting and receiving chip U1 is connected with a first end of the fourth capacitor C4, and second ends of the first capacitor C1, the second capacitor C2, the third capacitor C3 and the fourth capacitor C4 all are grounded;

a thirteenth end of the signal transmitting and receiving chip U1 is connected with first ends of the crystal oscillator Y1 and the fifth capacitor C5, a fourteenth end of the signal transmitting and receiving chip U1 is connected with second ends of the first crystal oscillator Y1 and the sixth capacitor C6, and second ends of the fifth capacitor C5 and the sixth capacitor C6 both are grounded; and a fifteenth end of the signal transmitting and receiving chip U1 is connected with the power supply.

Optionally, in order to distribute resources reasonably and reduce repeated use of resources, a switching circuit 203 is further arranged in the embodiment, and a first controller 202 is turned on or off through the switching circuit 203. When the food temperature information is transmitted unstably, a distance amplifier 20 can be started through the switching circuit 203, so as to improve the transmission range of the food temperature information. Optionally, the switching circuit 203 can be either a key or an electronic switch set through a preset program, or the switching circuit is set by means of a turn-on characteristic of a switch tube.

Optionally, the transmitting and receiving circuit 201 can be a radio frequency transceiver.

Optionally, the first controller 202 can be a single-chip microcomputer or a programmable logic device.

Optionally, the first power supply circuit 204 can take a battery as a power supply, and then, in order to guarantee normal work of each circuit, a voltage stabilizing module can be used to acquire a voltage that guarantees stable work of the circuit.

Optionally, in the embodiment, the transmitting and receiving circuit 201, the receiving circuit and the temperature collector 10 all can use the radio frequency transceiver to transmit data, and the radio frequency transceiver can be CMT2300A.

In the embodiment, the temperature collector 10 is internally provided with the temperature sensor, the signal transmitting and receiving antenna, the radio frequency chip, the transmitter and the power supply that supplies power to the temperature collector, where the power supply is a 1.5F super capacitor, the transmitter is constructed by an L110 chip, the radio frequency chip is configured to realize wireless data transmission, and in the temperature sensor, an antenna is further arranged. According to the temperature detection system provided by the embodiment of this application, a measuring terminal uses the super capacitor as the power supply, and the temperature sensor 10 and the radio frequency chip are configured to collect videos and temperatures and output collected data through the antenna.

The processing device receives the collected data. The processing device further includes an antenna configured to receive the collected data. A controller CA51FL3 acquires data collected by the antenna, and then sends the data to a boosting chip for boosting, analyzes the boosting data by using a voltage stabilizing chip, and displays a temperature collection result on a mobile terminal or a mobile phone screen. In the embodiment, the receiver uses two 1.5 V batteries as the power supply, a receiving chip receives a signal of the transmitter, converts it into a digital signal and sends it to the controller, and the controller drives the display screen to display corresponding temperature data and battery capacity data.

Optionally, the boosting chip can boost the voltage of the power supply to 3.3V and then output a stable 3.0 V voltage to a charging interface of a temperature collection probe.

Optionally, in the embodiment, a bandwidth of the antenna and the radio frequency chip is 433M.

Figure 9:
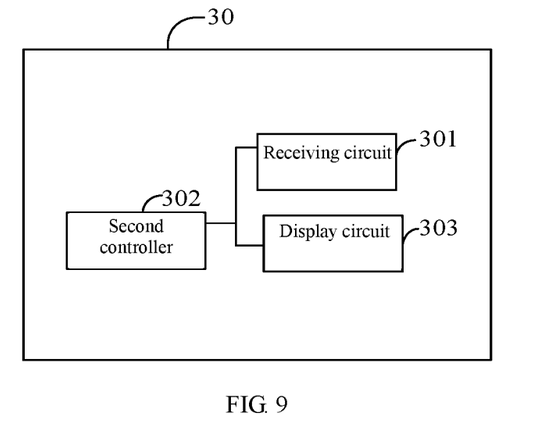
FIG. 9 is a schematic structure diagram of a processing device in a food temperature detection system provided by the utility model.

As shown in FIG. 9, the processing device 30 can include: a receiving circuit 301, a second controller 302 and a display circuit 303, where the receiving circuit 301 can be connected with the temperature collector 10 or the distance amplifier 20 and configured to acquire the food temperature information or the food temperature information with the amplified transmission range; in addition, the receiving circuit 301 is further connected with the second controller 302, the second controller 302 receives the food temperature information, and the second controller 302 will control the display circuit 303 to display the detected food temperature information according to the obtained food temperature information.

Optionally, the display circuit 303 includes: a display screen and a driving sub circuit, where the display screen is connected with the driving sub circuit, and the driving sub circuit is configured to receive the to-be-displayed food temperature information so as to control the display screen to display the food temperature information.

Optionally, the first controller 202 and the second controller 302 both can be single-chip microcomputers or other programmable logic devices.

Figure 10:
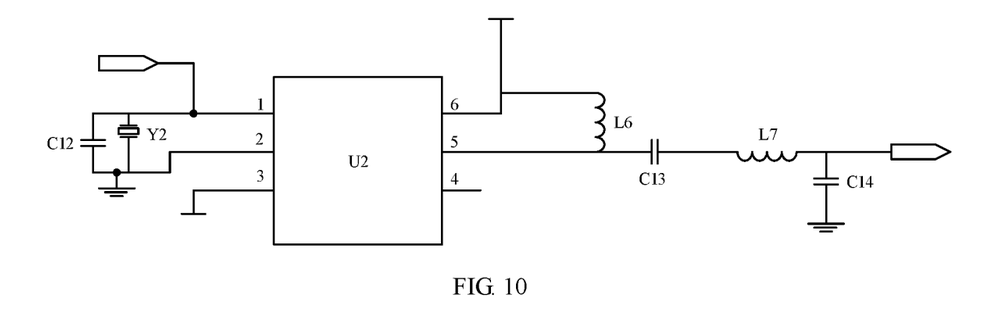
FIG. 10 is a circuit schematic diagram of a driving sub circuit of a processing device in a food temperature detection system provided by the utility model.

As shown in FIG. 10, the driving sub circuit can include: a driving chip U2, a second crystal oscillator Y2, a sixth inductor L6, a seventh inductor L7, a twelfth capacitor C12, a thirteenth capacitor C13 and a fourteenth capacitor C14, where a first end of the driving chip U2 is connected with the display screen and first ends of the second crystal oscillator Y2 and the twelfth capacitor C12, a second end of the driving chip U2 is connected with second ends of the second crystal oscillator Y2 and the twelfth capacitor C12, and second ends of the driving chip U2, the second crystal oscillator Y2 and the twelfth capacitor C12 all are grounded;

a third end of the driving chip U2 and the sixth end of the driving chip U2 are connected with the power supply; a fifth end of the driving chip U2 is connected with first ends of the sixth inductor L6 and the thirteenth capacitor C13, a second end of the thirteenth capacitor C13 is connected with a first end of the seventh inductor L7, a second end of the seventh inductor L7 is connected with a first end of the fourteenth capacitor C14 and the controller 302, a second end of the fourteenth capacitor C14 is grounded, and a second end of the sixth inductor L6 is connected with a sixth end of the driving chip U2.

Figure 11:
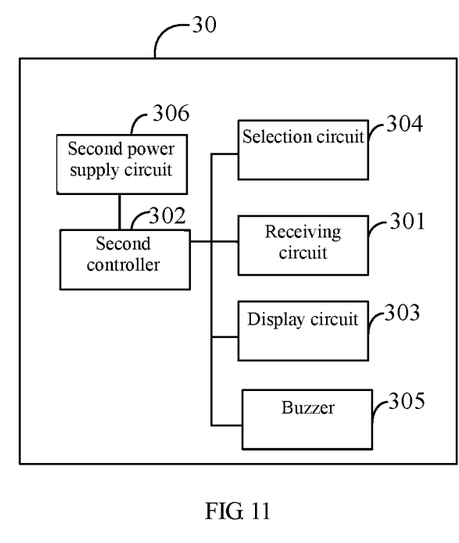
FIG. 11 is a schematic structure diagram of another processing device in a food temperature detection system provided by the utility model.

Optionally, as shown in FIG. 11, in order to detect the food temperature accurately, the processing device is further provided with a second power supply circuit 306, a selection circuit 304 and a buzzer 305, where the selection circuit 304 and the buzzer both are connected with the second controller 302, the selection circuit 304 is configured to select the displayed food temperature information, and the buzzer is configured to send an alarm prompt when the food temperature information is greater than a preset value. For example, when it is needed to heat beef to 60° C., it can be set in the processing device through the selection device. When the processing device detects that the temperature of the beef is 60° C., the buzzer sends an alarm to prompt.

Optionally, the second power supply circuit 306 can provide electric energy with the battery, and the temperature collector thereof can be charged through the second power supply circuit.

Optionally, the selection circuit 304 can be a switching circuit composed of a plurality of switches. The processing device thereof executes different functional operations by pressing different switches.

Figure 12:
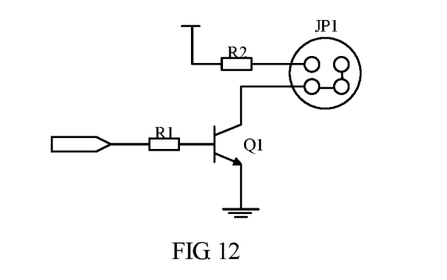
FIG. 12 is a connecting schematic diagram of a buzzer in a processing device in a food temperature detection system provided by the utility model.

Optionally, as shown in FIG. 12, a connecting circuit of the buzzer can include: a first resistor R1, a second resistor R2, a first triode Q1 and a buzzer body JP1, where a first end of the first resistor R1 is connected with the second controller 302, a second end of the first resistor R1 is connected with a base electrode of the first triode Q1, an emitting electrode of the first triode Q1 is grounded, a collecting electrode of the first triode Q1 is connected with a first end, a second end and a third end of the buzzer, a fourth end of the buzzer is connected with a first end of the resistor R2, and a second end of the resistor R2 is connected with the power supply.

The food temperature detection system provided by the embodiment can further be configured to detect the inner temperature of food, and the temperature collector thereof can be a temperature detection probe which detects the inner temperature of food (for example, the temperature detection probe is inserted into a steak). The temperature detection probe detects the temperature and sends it to the distance amplifier. The distance amplifier then sends the temperature to the processing device to display the temperature. The distance amplifier in the embodiment plays a role of increasing the distance to transmit signals. Specifically, in a closed metal oven, as the distance to transmit the signals to the processing device directly by the temperature detection probe is short, the distance amplifier is adsorbed to the side of the metal oven so as to increase the detection distance.

Figure 13:
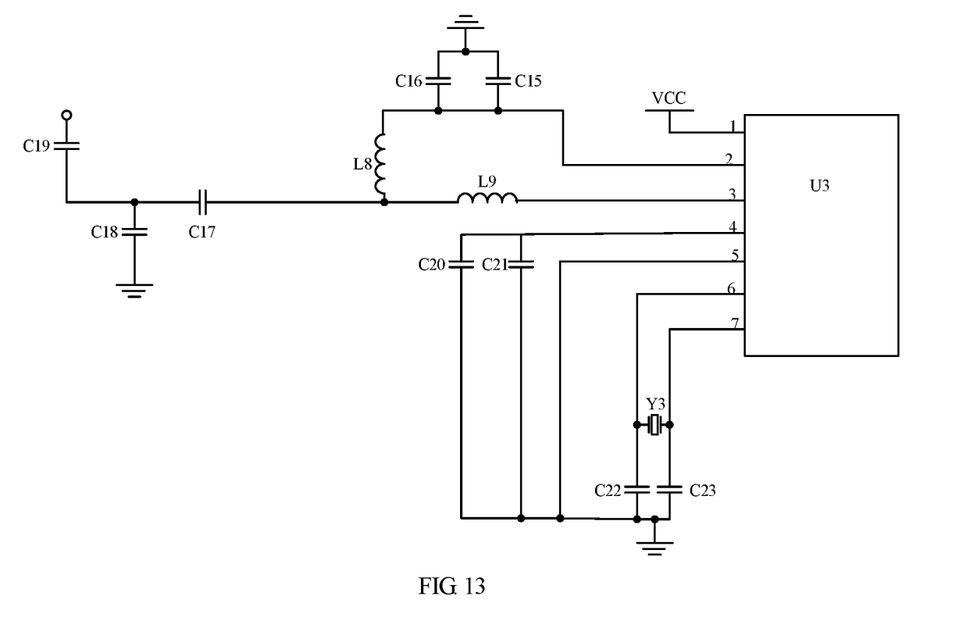
FIG. 13 is a circuit schematic diagram of a transmitting and receiving circuit of a distance amplifier in an optional food temperature detection system provided by the utility model.

Optionally, as shown in FIG. 13, the transmitting and receiving circuit can further include the transmitter U3, the third crystal oscillator Y3, the eighth inductor L8, the ninth inductor L9, the fifteenth capacitor C15, the sixteenth capacitor C16, the seventh capacitor C17, the eighteenth capacitor C18, the nineteenth capacitor C19, the twentieth capacitor C20, the twenty-first capacitor C21, the twenty-second capacitor C22 and the twenty-third capacitor C23.

The first end of the transmitter U3 is configured to acquire a power supply signal; the second end of the transmitter U3 is connected with the first end of the fifteenth capacitor C15, the first end of the sixteenth capacitor and the first end of the eighth inductor L8, and the second end of the fifteenth capacitor C15 and the second end of the sixteenth capacitor C16 are grounded; the third end of the transmitter U3 is connected with the first end of the ninth inductor L9, the second end of the ninth inductor L9 is connected with the second end of the eighth inductor L8 and the first end of the seventeenth capacitor C17, the second end of the seventeenth capacitor C17 is connected with the first end of the eighteenth capacitor C18 and the first end of the nineteenth capacitor C19, the second end of the eighteenth capacitor C18 is grounded, and the second end of the nineteenth capacitor C19 is connected with the radio frequency circuit (not shown); the fourth end of the transmitter U3 is connected with the first end of the twentieth capacitor C20 and the first end of the twenty-first capacitor C21; the fifth end of the transmitter U3, the second end of the twentieth capacitor C20 and the second end of the twenty-first capacitor C21 are grounded, the sixth end of the transmitter U3 is connected with the first end of the third crystal oscillator Y3 and the first end of the twenty-second capacitor C22, the seventh end of the transmitter U3 is connected with the second end of the third crystal oscillator Y3 and the first end of the twenty-third capacitor C23, and the second end of the twenty-second capacitor C22 and the second end of the twenty-third capacitor C23 are grounded.

In the embodiment, by arranging the transmitting and receiving circuit, food temperature can be measured wirelessly.

Apparently, the abovementioned embodiments are merely examples made for describing the utility model clearly and are not to limit the embodiments of the utility model. Changes or variations in other different forms can be further made by those of ordinary skill in the art on a basis of the description. It is unnecessary to and unable to list all the embodiments herein. Apparent changes or variations derived from this still fall into the scope of protection of the utility model.

What is claimed is:

1. A food temperature detection system, comprising;
a temperature collector configured to collect food temperature information;
a distance amplifier configured to improve a transmission range of the food temperature information collected by the temperature collector;
a processing device configured to receive the food temperature information, wherein the temperature collector and the distance amplifier both are connected with the processing device, and the temperature collector is connected with the distance amplifier; and
a transmitting and receiving circuit comprising: a signal transmitting and receiving chip, a first crystal oscillator, an MOS tube, a first inductor, a second inductor, a third inductor, a fourth inductor, a fifth inductor, a first capacitor, a second capacitor, a third capacitor, a fourth capacitor, a fifth capacitor, a sixth capacitor, a seventh capacitor, an eighth capacitor, a ninth capacitor, a tenth capacitor, an eleventh capacitor and an antenna, wherein a first end of the signal transmitting and receiving chip is connected with first ends of the first inductor, the second inductor and the ninth inductor, a second end of the ninth capacitor is connected with first ends of the third inductor and the fourth inductor, a second end of the fourth inductor is connected with first ends of the eleventh capacitor and the fifth inductor, and a second end of the fifth inductor is connected with the antenna; second ends of the eleventh capacitor and the second inductor both are grounded:
a second end of the signal transmitting and receiving chip is connected with second ends of the first inductor and the third inductor and a first end of the tenth capacitor, and a second end of the tenth capacitor is grounded;
a fourth end of the signal transmitting and receiving chip is connected with a first end of the eighth capacitor; a fifth end of the signal transmitting and receiving chip, a sixth end of the signal transmitting and receiving chip and a second end of the eighth capacitor all are grounded;
a seventh end of the signal transmitting and receiving chip is connected with first ends of the seventh capacitor and the MOS tube, a second end of the MOS tube is connected with a power supply, and a control end of the MOS tube is connected with the first controller;
a second end of the seventh capacitor is grounded; a ninth end of the signal transmitting and receiving chip is connected with the first end of the first capacitor, a tenth end of the signal transmitting and receiving chip is connected with a first end of the second capacitor, an eleventh end of the signal transmitting and receiving chip is connected with a first end of the third capacitor, a twelfth end of the signal transmitting and receiving chip is connected with a first end of the fourth capacitor, and second ends of the first capacitor, the second capacitor, the third capacitor and the fourth capacitor all are grounded;
a thirteenth end of the signal transmitting and receiving chip is connected with first ends of the crystal oscillator and the fifth capacitor, a fourteenth end of the signal transmitting and receiving chip is connected with second ends of the first crystal oscillator and the sixth capacitor, and second ends of the fifth capacitor and the sixth capacitor both are grounded; and
a fifteenth end of the signal transmitting and receiving chip is connected with the power supply.

2. The food temperature detection system according to claim 1, wherein the food temperature detection system comprises at least one temperature collector.

3. The food temperature detection system according to claim 2, wherein the temperature collector is a needle thermometer.

4. The food temperature detection system according to claim 1, wherein
the distance amplifier comprises:
the transmitting and receiving circuit, connected with the temperature collector and configured to receive the food temperature information collected by the temperature collector so as to output the food temperature information with the amplified transmission range;
a first controller, connected with the transmitting and receiving circuit and configured to receive the food temperature information collected by the temperature collector so as to amplify an output range of the food temperature information;
a switching circuit, connected with the first controller and configured to turn on or off the first controller; and
a first power supply circuit, connected with the first controller and configured to supply power to the distance amplifier.

5. The food temperature detection system according to claim 1, wherein the processing device comprises:
a receiving circuit, configured to receive the food temperature information with the amplified transmission range;
a second controller, connected with the receiving circuit and configured to receive the food temperature information so as to output to-be-displayed food temperature information; and
a display circuit, connected with the controller and configured to display the food temperature information.

6. The food temperature detection system according to claim 5, wherein the display circuit comprises:
a display screen and a driving sub circuit, wherein the display screen is connected with the driving sub circuit, and the driving sub circuit is configured to receive the to-be-displayed food temperature information so as to control the display screen to display the food temperature information.

7. The food temperature detection system according to claim 6, wherein the driving sub circuit comprises a driving chip, a second crystal oscillator, a sixth inductor, a seventh inductor, a twelfth capacitor, a thirteenth capacitor and a fourteenth capacitor, wherein a first end of the driving chip is connected with the display screen and first ends of the second crystal oscillator and the twelfth capacitor, a second end of the driving chip is connected with second ends of the second crystal oscillator and the twelfth capacitor, and second ends of the driving chip, the second crystal oscillator and the twelfth capacitor all are grounded; a third end of the driving chip and the sixth end of the driving chip are connected with the power supply; a fifth end of the driving chip is connected with first ends of the sixth inductor and the thirteenth capacitor, a second end of the thirteenth capacitor is connected with a first end of the seventh inductor, a second end of the seventh inductor is connected with a first end of the fourteenth capacitor and the controller, a second end of the fourteenth capacitor is grounded, and a second end of the sixth inductor is connected with a sixth end of the driving chip.

8. The food temperature detection system according to claim 5, wherein the processing device comprises: a selection circuit, connected with the controller and configured to select the displayed food temperature information.

9. The food temperature detection system according to claim 5, wherein the processing device comprises: a buzzer, connected with the controller and configured to send an alarm prompt when the food temperature information is greater than a preset value.

* * * * *